US006927378B2

(12) United States Patent
Gorog et al.

(10) Patent No.: US 6,927,378 B2
(45) Date of Patent: Aug. 9, 2005

(54) APPARATUS AND METHOD FOR MONITORING OF CATHODE RAY TUBE PANEL MANUFACTURING TO REDUCE CRT COST AND IMPROVE PERFORMANCE AND YIELD

(75) Inventors: Istvan Gorog, Lancaster, PA (US); Tony Tuan Vu, Lancaster, PA (US); Anthony Stanley Baran, Lancaster, PA (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 276 days.

(21) Appl. No.: 10/429,623

(22) Filed: May 5, 2003

(65) Prior Publication Data

US 2004/0222350 A1 Nov. 11, 2004

(51) Int. Cl.[7] .......................... G01N 21/00; H01J 40/14

(52) U.S. Cl. .................. 250/205; 250/221; 250/559.44; 356/239.7; 348/191

(58) Field of Search ................................ 250/205, 221, 250/222.1, 559.03, 559.4, 559.44, 559.46; 356/239.1, 239.7; 348/189, 191; 313/402, 407, 469

(56) References Cited

U.S. PATENT DOCUMENTS 4,748,330 A * 5/1988 Krufka .................. 250/559.26

* cited by examiner

*Primary Examiner*—Kevin Pyo

(74) *Attorney, Agent, or Firm*—Joseph S. Tripoli; Harvey D. Fried; Patricia A. Verlangieri

(57) ABSTRACT

A monitoring apparatus and method for measuring light output gradient of a faceplate panel includes a top plate having a center detector and a plurality of corner detectors mounted along a major surface thereof. Lenses are optically coupled to a respective detector, and radiometers are electrically coupled to a respective detector. A bottom plate spaced apart from the top plate has a plurality of light outputs mounted along a major surface thereof and positioned to be opposite each detector. A light source is optically coupled to each light output through a splitter. A computer is electrically coupled to the light source for receiving feedback therefrom and for controlling the light source. The computer is also electrically coupled to each radiometer for recording data therefrom.

During monitoring, a faceplate panel having a matrix applied thereto is accurately positioned between the top and bottom plates such that the center detector is located approximately above the center of the faceplate panel. Light is passed from the light sources through the faceplate panel to the detectors under control of the computer. The light output measurements at each detector are recorded by the computer and calculation is made of a light output gradient based upon a comparison of the light output at the center detector to the light output at the corner detector.

7 Claims, 2 Drawing Sheets

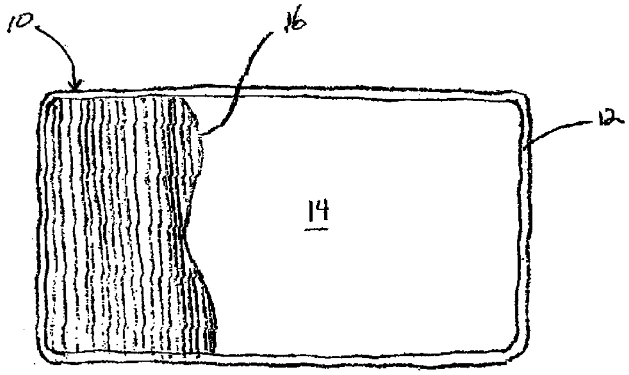
Fig 1
Fig 2
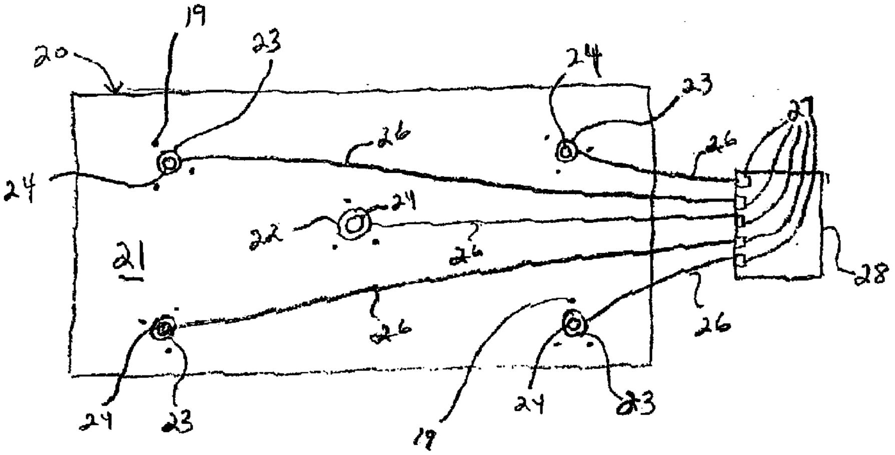
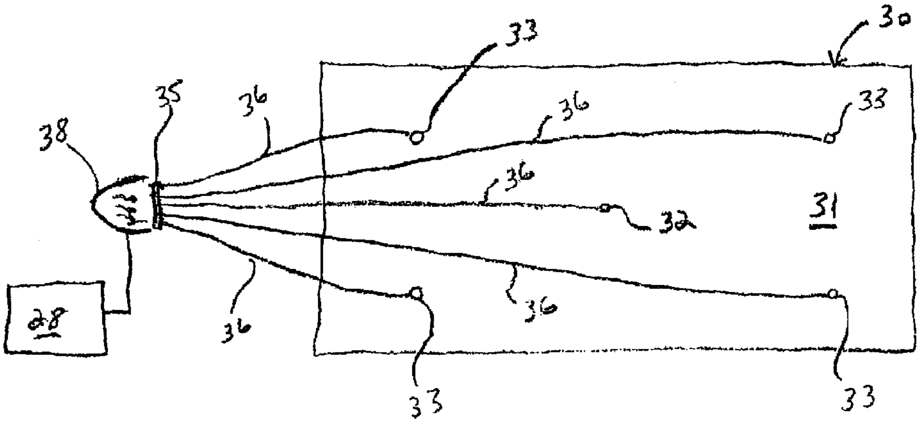
Fig 3

APPARATUS AND METHOD FOR MONITORING OF CATHODE RAY TUBE PANEL MANUFACTURING TO REDUCE CRT COST AND IMPROVE PERFORMANCE AND YIELD

FIELD OF THE INVENTION

This invention pertains generally to a method and apparatus for measuring light output through a periodic matrix on a surface and, particularly, to a method and apparatus for measuring such light output on a cathode-ray tube faceplate panel.

BACKGROUND OF THE INVENTION

Most cathode ray tubes exhibit a center to edge light output gradient. Typically, the center light output exceeds the corner light output and is the result of a number of contributing factors. For example, the geometry or thickness of the faceplate panel glass along with the absorption characteristics of the glass. Light output gradient is also affected by other processes applied to the inside of the faceplate panel. During production of cathode-ray tubes (CRTs) for color television receivers, a black matrix is applied to the inside surface of the faceplate panel. The black matrix consists of parallel lines which extend vertically as defined by the viewing orientation of a conventional tube. Black lines are spaced at desired intervals leaving transparent glass in the spaces between the matrix lines. The transparent spaces are coated with slurries of materials containing phosphors which emit the three primary colors of light, i.e., red, green and blue, when impacted by electrons. The three phosphors are alternately applied in a repetitive sequence such as red, green and blue to all the transparent spaces of the panel. Prior to the application of the phosphors, it is desirable to measure the matrix's contribution to light output gradient so that undesirable increase in the gradient caused by the matrix can be minimized thus avoiding the expensive application of phosphors to improperly matrixed faceplate panels. It is also desirable to record the light output gradient of each panel in order to optimize the matrix application process and better match the faceplate panel with other components of the CRT.

A system for measuring transparent space width in a matrix is shown in U.S. Pat. No. 4,525,735. This system has been found to be unacceptable in predicting resultant light output gradient in a finished CRT. A problem with such a system is that the panel movement takes a relatively long time and repetitive movements and tests are required in multiple passes. This lowers the production rate to a point where it may be impossible to meet a particular desired inspection time, e.g., 12 seconds per panel. Another problem with this system is that invalid readings can be processed, which can result in the acceptance of an out-of-tolerance panel.

SUMMARY OF THE INVENTION

The invention provides an apparatus and method for monitoring a matrix applied to a faceplate panel in the process of producing a CRT. A monitoring apparatus and method for measuring light output gradient of a faceplate panel includes a top plate having a center detector and a plurality of corner detectors mounted along a major surface thereof. Lenses are optically coupled to a respective detector, and radiometers are electrically coupled to a respective detector. A bottom plate spaced apart from the top plate has a plurality of light outputs mounted along a major surface thereof and positioned to be opposite each detector.

A light source is optically coupled to each light output through a splitter. A computer is electrically coupled to the light source for receiving feedback therefrom and for controlling the light source. The computer is also electrically coupled to each radiometer for recording data therefrom.

During monitoring, a faceplate panel having a matrix applied thereto is accurately positioned between the top and bottom plates such that the center detector is located approximately above the center of the faceplate panel. Light is passed from the light sources through the faceplate panel to the detectors under control of the computer. The light output measurements at each detector are recorded by the computer and calculation is made of a light output gradient based upon a comparison of the light output at the center detector to the light output at the corner detector.

BRIEF DESCRIPTION OF THE DRAWINGS

The invention will now be described by way of example with reference to the accompanying figures of which:

FIG. 1 is a top view of a display panel.

FIG. 2 is a top view of a top plate for use in the monitoring apparatus of the invention.

FIG. 3 is a bottom view of a bottom plate for use in the monitoring apparatus of the invention.

DETAILED DESCRIPTION OF THE INVENTION

Figure 4:
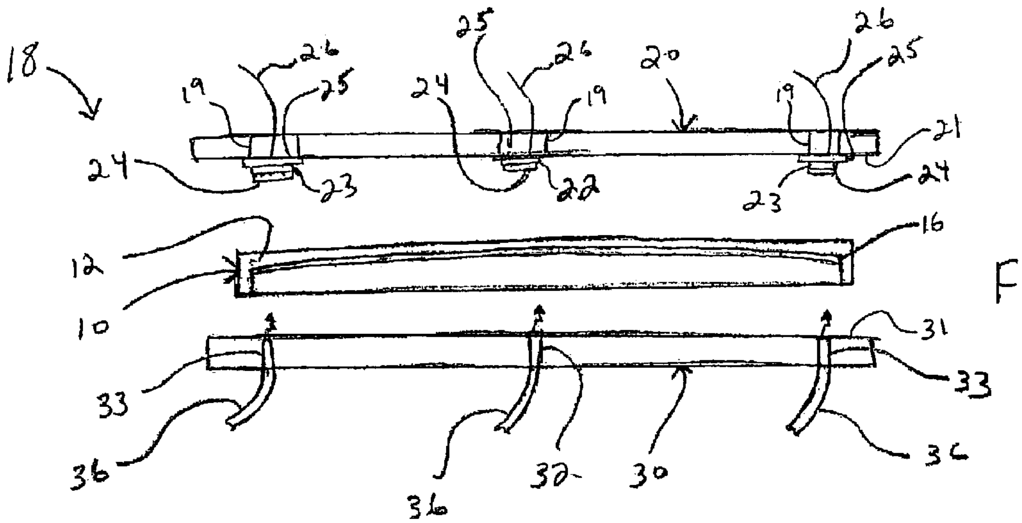
FIG. 4 is a side view of part of the monitoring apparatus including the top and bottom plates and a panel under test.

The monitoring apparatus 18 of the present invention will now be described in greater detail with reference to FIGS. 1–5. Referring first to FIG. 1, a faceplate panel 10 for use in a cathode ray tube (CRT) is shown. The faceplate panel 10 consists of a front face 14 surrounded by a plurality of side walls 12. The side walls 12 extend generally orthogonal to the front face 14. The side walls 12 are generally attached to funnel forming a tube having an electron gun at an opposite end facing the faceplate panel 10. A matrix 16 is applied to the inner surface of the front face 14. The matrix 16 consists of a plurality of parallel lines which extend vertically across the entire inner surface of the front face 14.

Figure 5:
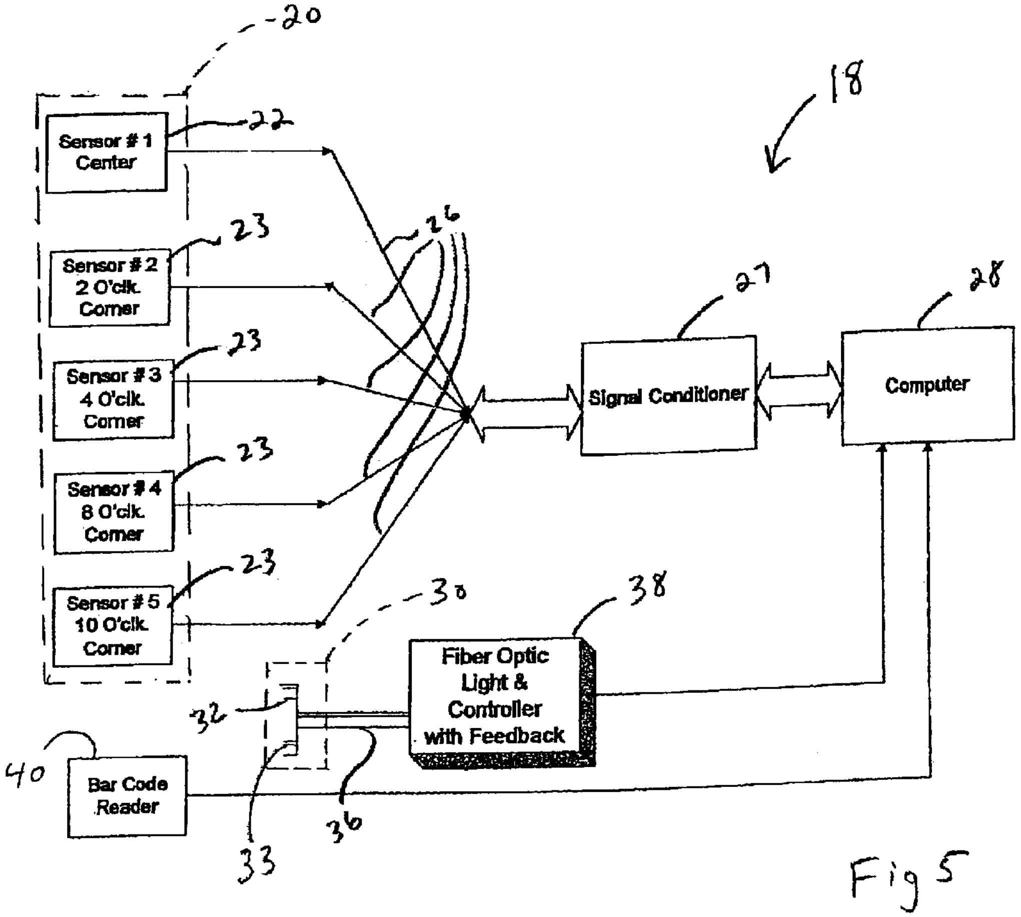
FIG. 5 is a block diagram of the monitoring apparatus according to the invention.

Turning now to FIGS. 4 and 5, the monitoring apparatus 18 is shown. The monitoring apparatus 18 consists generally of a computer 28, a signal conditioner 27, a light source 38, a bar code reader 40, a top plate 20 having a plurality of sensors and a bottom plate 30 having a plurality of light outputs which are aligned to each other. For monitoring purposes, the faceplate panel 10 is accurately and temporarily positioned between the top plate 20 and the bottom plate 30 as will be described in greater detail below.

First each of the plates 20, 30 will be described in greater detail with reference to FIGS. 2–4. Referring to FIG. 2, the top plate 20 consists of a generally rigid material forming a major surface 21. A plurality of light detectors 22, 23 are located along the major surface 21. A center detector 22 is located approximately in the center of the major surface 21 while a plurality of corner detectors 23 are located at a position relative to each corner of the major surface 21. As best shown in FIG. 4, a lens 24 is attached to each detector 22, 23 on the side facing the faceplate panel 10. A radiometer 25 is attached to and is in communication with each detector 22, 23. An interconnection 26 to each radiometer 25 is provided for carrying the electrical signals generated by the radiometer 25 to the electronic components of the system. Each of the interconnections 26 is connected from a respective radiometer 25 through a signal conditioner 27 to a computer 28. The radiometers 25, detectors 22, 23 and lens 24 are each mounted along the major surface 21 by a plurality of leveling members 19 preferably oriented in a triangular orientation.

The bottom plate 30 will now be described in greater detail with reference to FIGS. 3 and 4. The bottom plate 30 is formed of a rigid material having a major surface 31. A plurality of light outputs 32, 33 are positioned along the major surface 31 at locations which are aligned with the detectors 22, 23 of the top plate 20. A center light output 32 is aligned with the center detector 22 while a plurality of corner light outputs 33 are each aligned with respective corner detectors 23. Each light output 32, 33 is connected to a wave guide 36 which carries light from a common light source 38 through a splitter 35 to each of the light outputs 32, 33. The light source 38 is controllable and may be monitored by a computer 28 or other suitably monitoring device to achieve consistent and stable output over the life of the light source 38.

The light source 38 includes a high intensity, stable light source and a controller with feedback capability which is connectable to the computer 28. The computer 28 may be a personal computer or other general purpose computing device which is capable of receiving signals from multiple sources, controlling those sources and conducting various calculations. A bar code reader 40 is also connected to the computer and is configured to read identification bar code markings which are on each faceplate panel 10 being monitored. The bar code reader 40 is substitutable with any suitable identification device capable of reading identification markings on each faceplate panel 10.

Operation of the monitoring apparatus 18 will now be described with reference again to FIGS. 4 and 5. A faceplate panel 10 is accurately positioned between the top and bottom plates 20, 30 such that the center detector 22 is approximately aligned with the center of the faceplate panel 10 while each of the corner detectors 23 is approximately aligned with a selected location along each corner of the faceplate panel 10. This positioning may be accomplished utilizing a suitable conveyer having an automatic centering and positioning device. Once positioned, the panel 10 is identified by reading the bar code with the bar code reader 30. Alternatively, the bar code could be read as the panel is moved along the conveyor either before, during or after positioning. Under control of the computer 28, light is then passed from the light source 38, through the matrix 16 and front face 14 at the center and the corners from the light sources 38 to each of the respective detectors 22, 23. An electrical output from respective radiometers 26 is passed through the signal conditioners 27 and the data is logged by the computer 28. Using the logged data the computer 28 compares light output readings from the center detector 22 with each of the corner detectors 23. This comparison results in a light output gradient which is a measure of light transmission in the center as compared with the corners. Measurement of the light output gradient is an indication of whether a viewer will notice dark areas in the corners of the front face 14 when viewing the finished CRT. In the event that the light output gradient exceeds an acceptable threshold, the faceplate panel 10 under test may be rejected. Upon rejection, a faceplate panel 10 will have the matrix 16 removed and reapplied. The faceplate panel 10 with the reapplied matrix 16 will be retested according to the procedure outlined here. Alternatively, in the event the light output gradient exceeds some predetermined range but is within the acceptable threshold, the light output gradient information can be utilized to make appropriate corrective adjustments to the manufacturing process that accomplishes the matrix 16 application to the faceplate panel 10 and, thereby, the light output gradient can be maintained during production runs within specified ranges.

This system advantageously results in greater throughput since each panel can be tested in a single pass operation. This system also prevents finding a defective matrix 16 after a CRT is assembled and other value added components have been added thus reducing scrap and assembly time caused by a bad matrix 16.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A monitoring apparatus for measuring light output gradient of a faceplate panel comprising:

a top plate having a center and a plurality of corner detectors mounted along a major surface thereof, lenses each being optically coupled to a respective detector, and radiometers each being electrically coupled to a respective detector;

a bottom plate spaced apart from the top plate having a plurality of light output mounted along a major surface thereof and positioned to be opposite each detector;

a light source being optically coupled to each light output through a splitter; and a computer being electrically coupled to the light source for receiving feedback therefrom and for controlling the light source and being electrically coupled to each radiometer for recording data therefrom and for calculating a light output gradient based upon a comparison of the light output at the center detector to the light output at the corner detector.

2. The monitoring apparatus as recited in claim 1 further comprising a bar code reader being coupled to the computer.

3. A method of measuring light output gradient in a faceplate panel comprising:

providing a top plate having light detectors positioned at a central location and at least one corner;

providing a bottom plate having light sources positioned at a center and at least one corner corresponding to the locations of the detectors in the top plate;

providing a computer for controlling the light source and for logging data from the detectors;

positioning a faceplate panel having a matrix applied thereto between the top and bottom plates such that the center detector is located approximately above the center of the faceplate panel;

passing light from the light sources through the faceplate panel to the detectors under control of the computer;

recording the light output measurements at each detector;

calculating a light output gradient based upon a comparison of the light output at the center detector to the light output at the corner detector.

4. The method of claim 3 wherein the light output gradient is stored and compared to an acceptable threshold value.

5. The method of claim 4 wherein the faceplate panel is rejected and the matrix is reprocessed if the light output gradient is greater than the acceptable threshold value.

6. The method of claim 4 wherein the stored light output gradient which is below the acceptable threshold value is monitored for a series of faceplate panels and utilized to make corrective adjustments to a matrix application process.

7. The method of claim 4 wherein the stored light output gradient which is below the acceptable threshold value is utilized for matching a particular faceplate panel to other components which form a cathode ray tube.

* * * * *